United States Patent
Yamamoto et al.

(10) Patent No.: US 6,696,863 B2
(45) Date of Patent: Feb. 24, 2004

(54) CLOCK SIGNAL DISTRIBUTION CIRCUIT

(75) Inventors: Kenji Yamamoto, Tokyo (JP); Kazuhiro Nakajima, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/244,507

(22) Filed: Sep. 17, 2002

(65) Prior Publication Data

US 2003/0052724 A1 Mar. 20, 2003

(30) Foreign Application Priority Data

Sep. 18, 2001 (JP) ........................................ 2001-283953

(51) Int. Cl.$^7$ .............................. H03K 19/00; G06F 1/04
(52) U.S. Cl. ........................ 326/93; 326/101; 327/295
(58) Field of Search ............................ 326/93, 95, 96, 326/101; 327/291, 293, 295–297

(56) References Cited

U.S. PATENT DOCUMENTS 6,204,713 B1 * 3/2001 Adams et al. .............. 327/295
6,255,884 B1 * 7/2001 Lewyn ....................... 327/295
6,311,313 B1 * 10/2001 Camporese et al. ........... 716/6
6,380,788 B1 * 4/2002 Fan et al. ................... 327/295

FOREIGN PATENT DOCUMENTS

JP          08116025 A  *  5/1996  ........... H01L/27/04
JP          11-175184 A     7/1999

* cited by examiner

*Primary Examiner*—James H Cho
(74) *Attorney, Agent, or Firm*—Sughrue Mion, PLLC

(57) ABSTRACT

A tree wiring distributes an externally supplied clock signal to a plurality of first clock buffers. Routes of the tree wiring are designed so that the externally supplied clock signal can reach the plurality of first clock buffer substantially at the same time. The plurality of first clock buffers are connected to all intersections existing on a mesh wiring in one to one correspondence. The plurality of first clock buffers supply a clock signal supplied thereto through the tree wiring, to the mesh wiring. The mesh wiring protrudes from the intersections thereof which face toward outside by a predetermined length in order to keep load imposed on the plurality of first clock buffers uniform. A plurality of second clock buffers are connected to the mesh wiring, and supply clock signals supplied thereto from the plurality of first clock buffers through the mesh wiring, to a plurality of circuit elements.

13 Claims, 12 Drawing Sheets

CLOCK SIGNAL DISTRIBUTION CIRCUIT

BACKGROUND OF THE INVENTION

1. Field of the Invention

The present invention relates to a circuit for distributing a clock signal to a plurality of circuits constituting a semiconductor device.

2. Description of the Related Art

A device constituted by LSI (Large Scale Integrated circuit), etc. operates synchronously with a clock signal. Specifically, a clock signal is distributed to a plurality of circuit elements constituting the device. The plurality of circuit elements operates in accordance with the distributed clock signal.

At this time, if the lengths of wirings connecting the distributor of the clock signal and the plurality of circuit elements are not uniform, there might be caused a difference between periods of time for the clock signal to reach each of the plurality of circuit elements. If the difference is too large, timings at which signals to be processed are input or output to or from the respective circuit elements might not be coincident, resulting in that the device incorrectly functions.

A technique for preventing occurrence of a difference in time for a clock signal to reach (clock skew) is disclosed in Unexamined Japanese Patent Application KOKAI Publication No. H11-175184.

The first technique disclosed in this publication is for distributing a clock signal using an H-shaped clock wiring.

Specifically, as shown in FIG. 9A, a first driver 11 is placed in the center of a chip. A clock wiring 14 having an H shape is formed to have its center at the first driver 11. Four second drivers 12 are connected to the tips of the H-shaped clock wiring 14. Four H-shaped clock wirings 15 are formed to have their centers at the four second drivers 12, respectively. Sixteen third drivers 13 are connected to the tips of the four H-shaped clock wirings 15.

A clock signal is supplied from the first driver 11 through the four second drivers 12 to the sixteen third drivers 13, from which the clock signal is supplied to a plurality of circuit elements.

The second technique disclosed in this publication is for distributing a clock signal using an H-shaped clock wiring and a meshed wiring.

Specifically, as shown in FIG. 9B, a first driver 11 and four second drivers 12 are connected to each other by an H-shaped clock wiring 14, likewise the above. The four second drivers 12 are connected to sixteen third drivers 13 by a meshed wiring 21.

Likewise the case in FIG. 9A, a clock signal is supplied from the first driver 11 through the four second drivers 12 to the sixteen third drivers 13, and the clock signal is supplied from the sixteen third drivers 13 to a plurality of circuit elements.

The above described first technique only uses an H-shaped clock wiring. Therefore, positions and number for providing drivers (buffers) are limited. In this case, in order to avoid occurrence of a clock skew, it is necessary to arrange the plurality of circuit elements in correspondence with the positions of the third drivers 13. In other words, the positions for arranging the plurality of circuit elements are limited.

According to the second technique described above, a clock signal is supplied from the four second drivers 12 to the meshed wiring. Therefore, time for the clock signal to reach each intersection on the meshed wiring is varied in accordance with distance from the second drivers 12. In this case, the positions for arranging the third drivers 13 are limited in order to avoid occurrence of a clock skew. As a result, the positions for arranging the plurality of circuit elements are also limited.

Further, according to the structure shown in FIG. 9B, if a part is removed from the meshed wiring, load which is imposed on the four second drivers 12 becomes non-uniform. This non-uniformity of load may be the cause of occurrence of a clock skew. Therefore, any part of the meshed wiring shown in FIG. 9B should not be removed. As a result, positions for arranging macros such as a CPU (Central Processing Unit), a memory, etc. are limited.

The disclosure of Unexamined Japanese Patent Application KOKAI Publication No. H11-175184 is incorporated herein by reference.

SUMMARY OF THE INVENTION

Accordingly, it is an object of the present invention to provide a clock signal distribution circuit which is capable of preventing occurrence of a clock skew without limiting arrangement of circuit elements constituting a device.

To achieve the above object, a clock signal distribution circuit according to the present invention distributes an externally supplied clock signal to a plurality of circuits, and comprises:

- a tree wiring having wiring routes branched like a tree;
- a mesh wiring having meshed wiring routes;
- a plurality of first clock buffers which are connected to terminals of the tree wiring, and supply a clock signal supplied thereto from outside through the tree wiring, to the mesh wiring; and
- a plurality of second clock buffers which are connected to the mesh wiring, and supply the clock signal supplied thereto from the plurality of first clock buffers through the mesh wiring, to the plurality of circuits,
- wherein the plurality of first clock buffers are connected to intersections which exist on the wiring routes of the mesh wiring in one to one correspondence.

According to this invention, it is possible to prevent occurrence of a clock skew without limiting arrangement of circuit elements constituting a device.

The mesh wiring may protrude from intersections thereof which face toward outside by a predetermined length, so that load to be imposed on the plurality of first clock buffers becomes uniform.

The mesh wiring may be constituted by a plurality of horizontal wirings arranged in parallel with one another at predetermined intervals, and a plurality of vertical wirings arranged in parallel with one another at predetermined intervals and perpendicularly to the horizontal wirings.

Ends of the plurality of horizontal wirings and ends of the plurality of vertical wirings may protrude from closest intersections by a length corresponding to a half of a mesh pitch.

A part of the mesh wiring may be removed, where the part corresponds to a region for arranging a macro to be arranged within an area in which the mesh wiring is formed.

The mesh wiring may protrude from intersections thereof which face toward the removed part by a predetermined length, so that load to be imposed on the plurality of first clock buffer becomes uniform.

The mesh wiring may be constituted by a plurality of horizontal wirings arranged in parallel with one another at predetermined intervals, and a plurality of vertical wirings arranged in parallel with one another at predetermined intervals and perpendicularly to the horizontal wirings.

In neighborhood of the removed part of the mesh wiring, ends of the plurality of horizontal wirings and ends of the plurality of vertical wirings may protrude from closest intersections by a length corresponding to a half of a mesh pitch.

Same number of the plurality of second clock buffers may be provided to each of a plurality of regions enclosed by the wiring routes of the mesh wiring.

Among the plurality of second clock buffers, a second clock buffer, to which no target circuit of supplying the clock signal is connected, may function as a dummy buffer in order to keep load to be imposed on the plurality of first clock buffers uniform.

The plurality of second clock buffers may be connected between intersections of the mesh wiring.

The tree wiring comprises at least one branching point at which a wiring route is branched into three routes.

The wiring routes of the tree wiring may be designed so that an externally supplied clock signal reaches the plurality of first clock buffers substantially at a same time.

Each of branching points of the tree wiring may have a third clock buffer which outputs a clock signal which is synchronous with a clock signal supplied thereto.

The third clock buffer which is connected to a first branching point among the branching points of the tree wiring may be arranged outside of an area in which the mesh wiring is formed.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A clock signal distribution circuit according to an embodiment of the present invention will now be explained below with reference to the drawings.

The clock signal distribution circuit according to the embodiment of the present invention distributes an externally supplied clock signal to a plurality of circuit elements (a flip flop (F/F) circuit, etc.) arranged within a chip.

Figure 1:
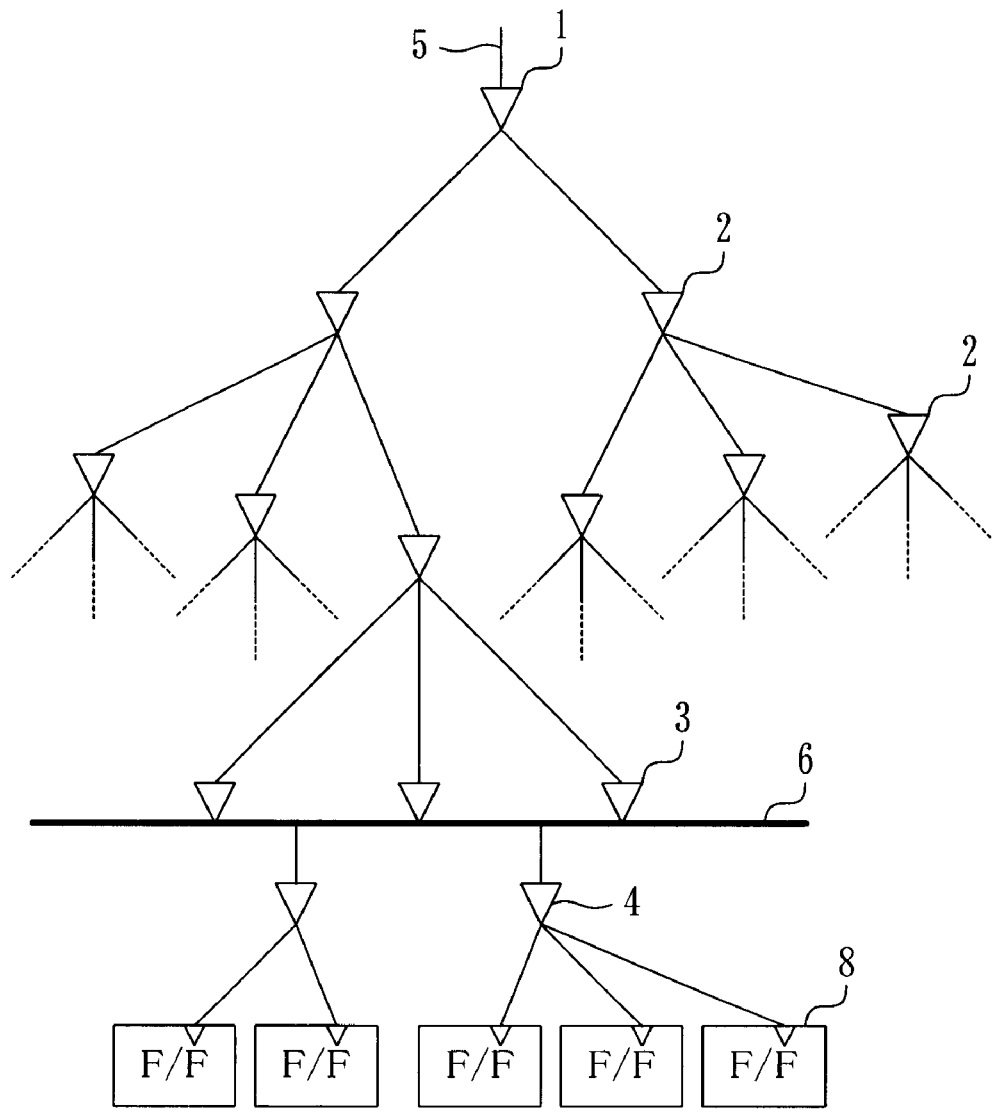
FIG. 1 to FIG. 5 are diagrams showing structures of a clock signal distribution circuit according to an embodiment of the present invention.

The clock signal distribution circuit comprises a root buffer 1, a plurality of relay buffers 2, a plurality of drive buffers 3, a plurality of end buffers 4, a tree wiring 5, and a mesh wiring 6, as shown in FIG. 1.

Figure 2:
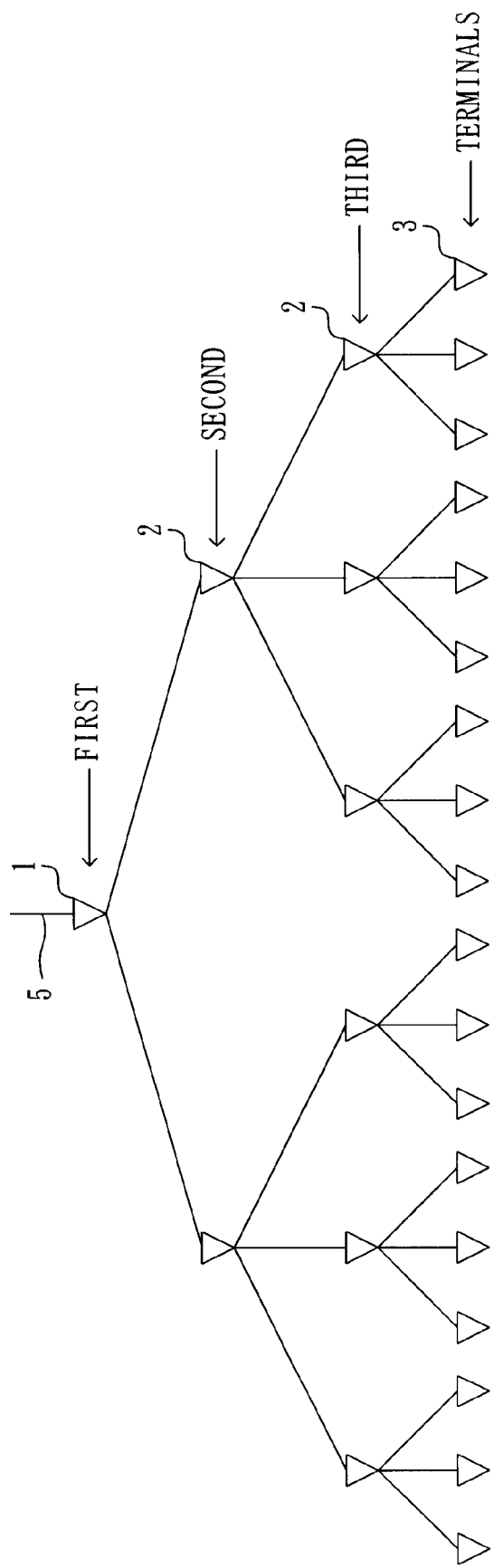

As shown in FIG. 2, the root buffer 1 is connected to the first branching point of the tree wiring 5. The plurality of relay buffers 2 are connected to the second branching points or branching points thereafter of the tree wiring 5 in one to one correspondence. The plurality of drive buffers 3 are connected to terminals of the tree wiring 5, respectively.

Each of the root buffer 1 and plurality of relay buffers 2 are constituted by PLL (Phase Locked Loop) circuits, and generate and output clock signals which synchronize with a clock signal supplied thereto. As a result, the clock signal supplied from outside is supplied to each of the plurality of drive buffers 3 through the root buffer 1 and the plurality of relay buffers 2.

Routes of the tree wiring 5 are so designed that the clock signal output from the root buffer 1 reaches the plurality of drive buffers 3 substantially at the same time. In other words, routes of the tree wiring 5 are designed to cause substantially no clock skew.

An output terminal of each of the drive buffers 3 is connected to the mesh wiring 6. Each drive buffer 3 is constituted by a PLL circuit, and generates and outputs a clock signal synchronous with a clock signal supplied thereto and thereby to drive the mesh wiring 6.

Figure 3:
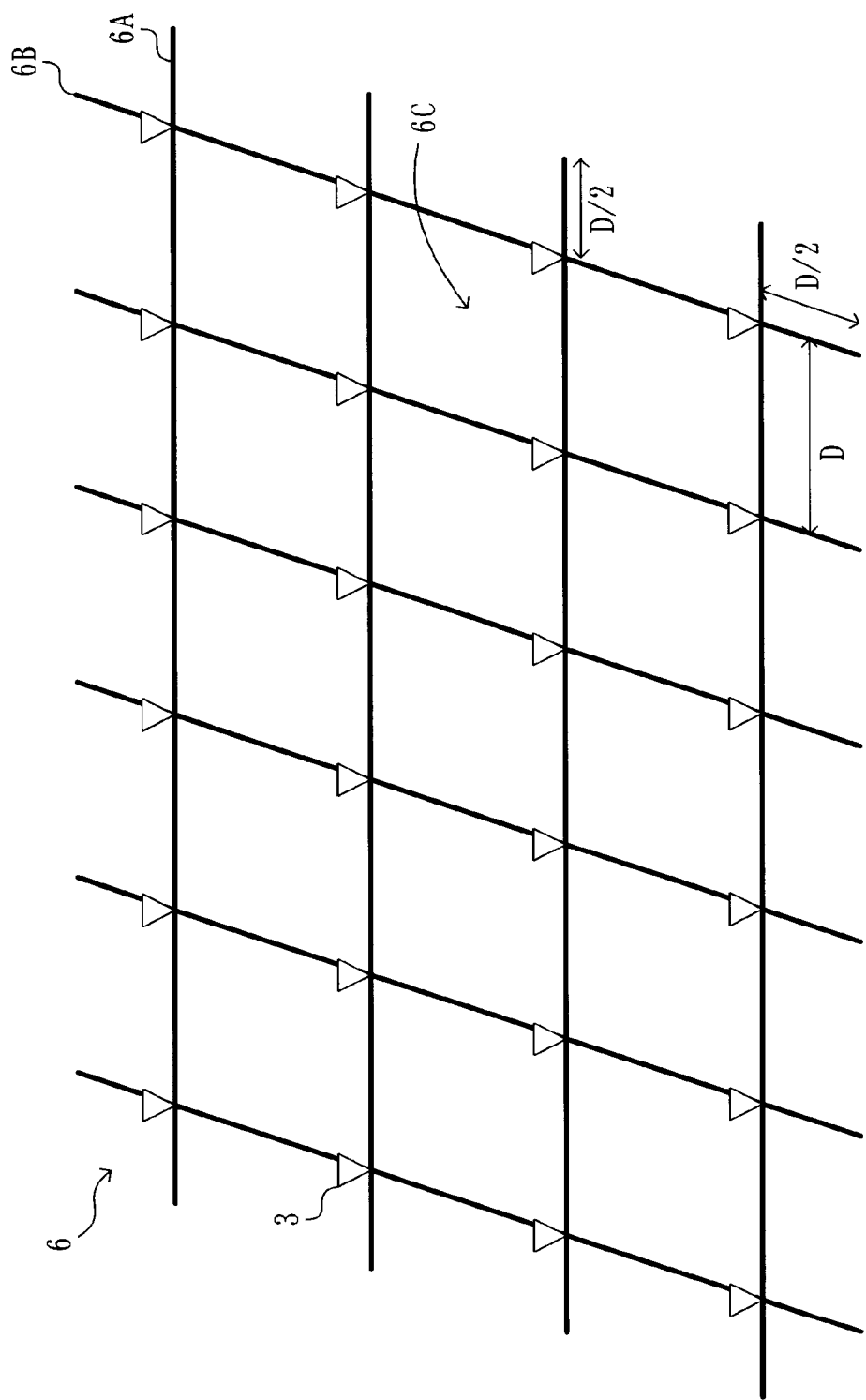

The mesh wiring 6 comprises a plurality of horizontal wirings 6A and a plurality of vertical wirings 6B, as shown in FIG. 3.

The plurality of horizontal wirings 6A are arranged in parallel with one another at predetermined intervals. The plurality of vertical wirings 6B are arranged in parallel with one another at predetermined intervals, and perpendicularly to the plurality of horizontal wirings 6A.

The plurality of horizontal wirings 6A and the plurality of vertical wirings 6B may be arranged on a same plane to be connected to each other. Or, the plurality of horizontal wirings 6A and the plurality of vertical wirings 6B may be arranged on different planes from each other, and connected to each other via through holes which are formed at the intersections of the horizontal wirings 6A and the vertical wirings 6B.

All of the intersections of the plurality of horizontal wirings 6A and the plurality of vertical wirings 6B are connected to the plurality of drive buffers 3 in one to one correspondence. Each of the drive buffers 3 can be treated as an ordinary block. Thus, specially-made wiring areas are not needed for connecting the plurality of drive buffers 3 and the mesh wiring 6.

Ends of each of the plurality of horizontal wirings 6A and plurality of vertical wirings 6B protrude from the closest intersections by a half of a mesh pitch D as shown in FIG. 3. Because of this, load to be imposed on the plurality of drive buffers 3 becomes uniform.

Figure 4:
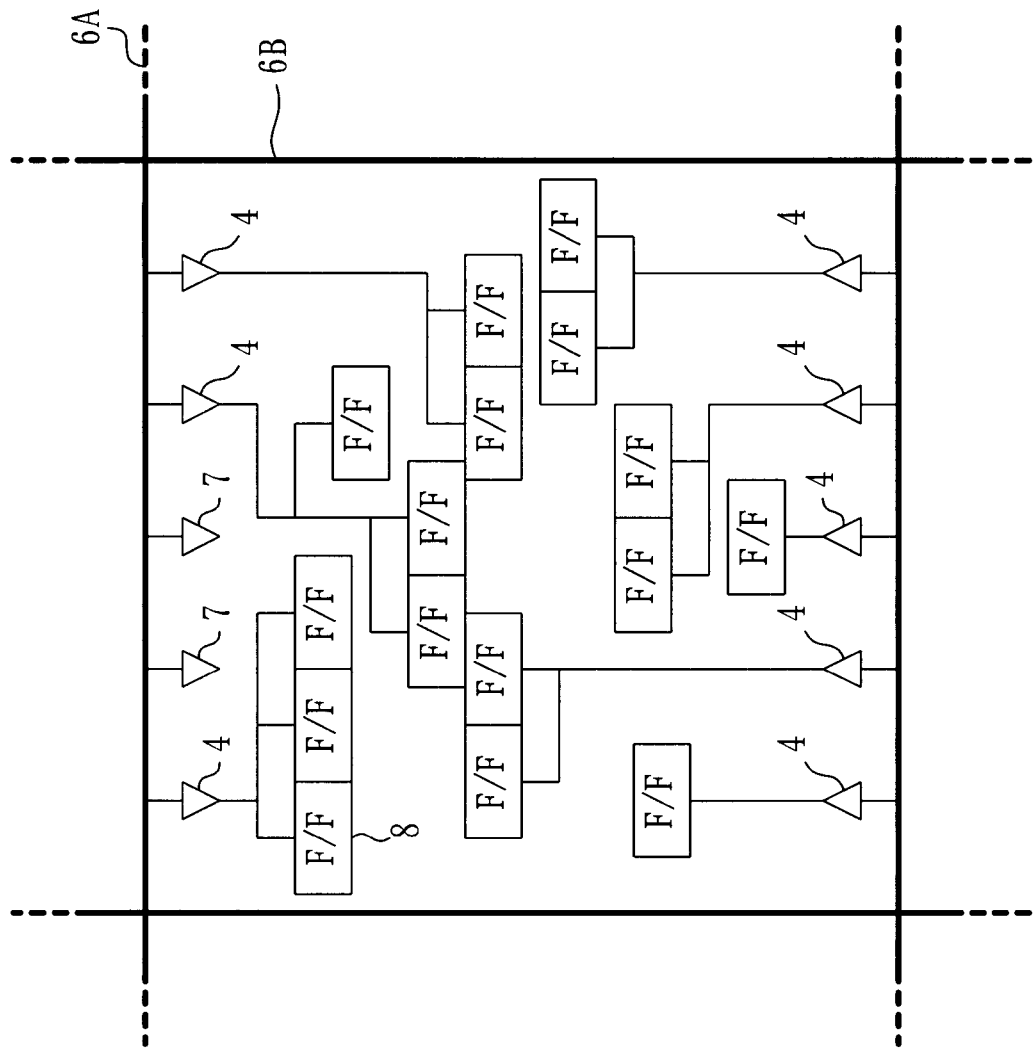

The plurality of end buffers 4 and a plurality of circuit elements 8 are arranged within each of a plurality of areas 6C enclosed by the horizontal wirings 6A and vertical wirings 6B, as shown in FIG. 4.

As shown in FIG. 4, each of the plurality of end buffers 4 has its input terminal connected to a point between the intersections of the mesh wiring 6, and its output terminal connected to a clock terminal of a circuit element 8 to which each of the plurality of end buffers 4 is to supply a clock signal. Each end buffer 4 is constituted by a PLL circuit, generates a clock signal which is synchronous with a clock signal supplied from the drive buffer 3 through the mesh wiring 6, and outputs the generated clock signal to the target circuit element 8.

The number of end buffers 4 arranged within one area 6C is set equal to that of the other areas 6C, in order to make the load to be imposed on the drive buffers 3 uniform. On the other hand, the number of circuit elements 8 arranged within one area 6C is arbitrary. Accordingly, an end buffer 4 to whose output terminal no circuit element 8 is connected, that is, an end buffer 4 whose output terminal is free, functions as a dummy buffer 7 for making the load to be imposed on the drive buffers 3 uniform.

Figure 5:
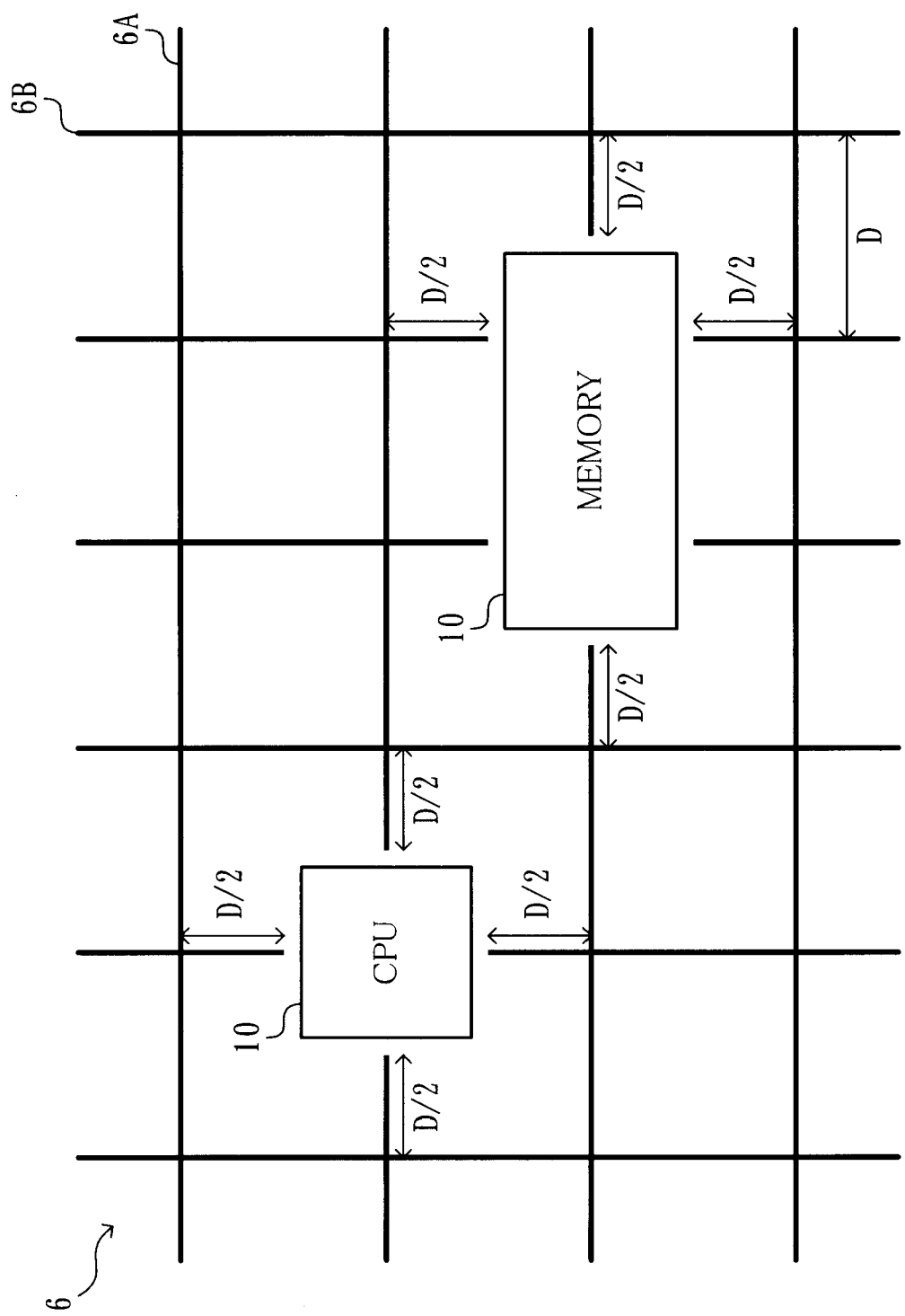

In a case where macros 10 such as a CPU (Central Processing Unit) and a memory are arranged within the entire area for forming the mesh wiring 6, portions of the mesh wiring 6 that correspond to the positions for arranging the macros 10 are removed, as shown in FIG. 5.

At this time, the portions of the mesh wiring 6 that are to be removed are so defined that the end portions of the horizontal wirings 6A and the vertical wirings 6B protrude from the closest intersections by a half of the mesh pitch D. Due to this, even if the portions of the mesh wiring 6 that correspond to the macros 10 are removed, it is possible to keep the load to be imposed on the plurality of drive buffers 3 uniform.

Next, procedures for designing the clock signal distribution circuit according to the embodiment of the present invention will be explained.

The procedures for designing the clock signal distribution circuit described below can be performed using a CAD (Computer Aided Design) system, etc.

Figure 6:
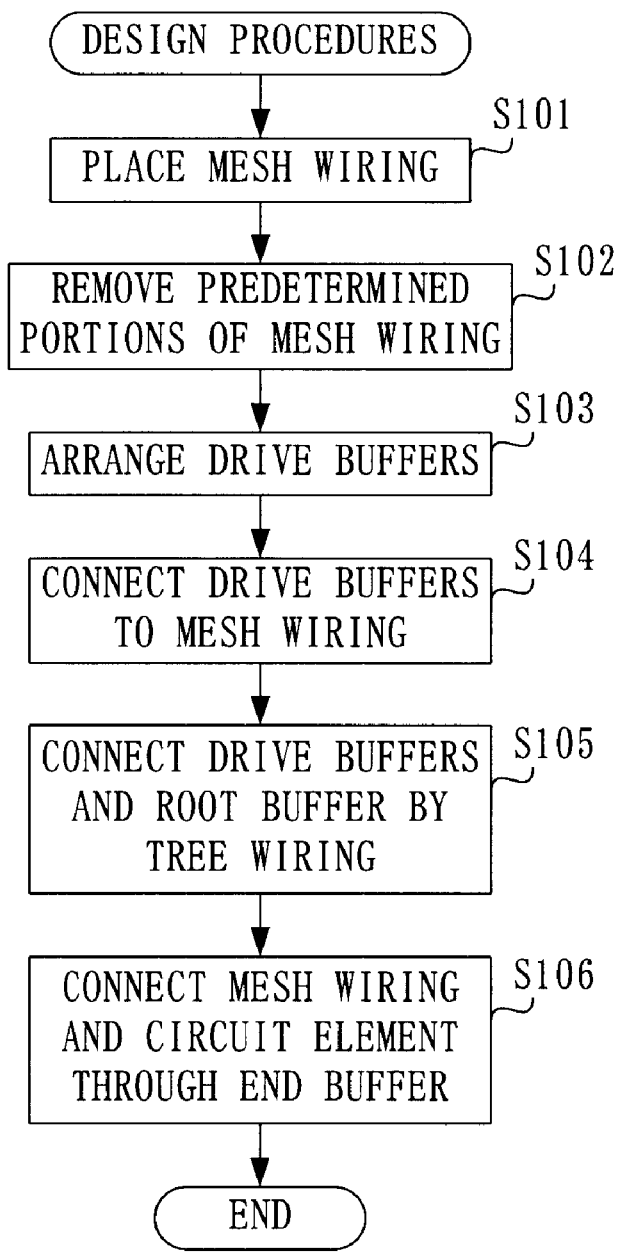
FIG. 6 is a flowchart showing design procedures of the clock signal distribution circuit shown in FIG. 1 to FIG. 5.

FIG. 6 is a flowchart showing the design procedures for the clock signal distribution circuit.

It should be noted that all the necessary circuit elements 8 and macros 10 are arranged on the predetermined positions in advance.

Figure 7A:
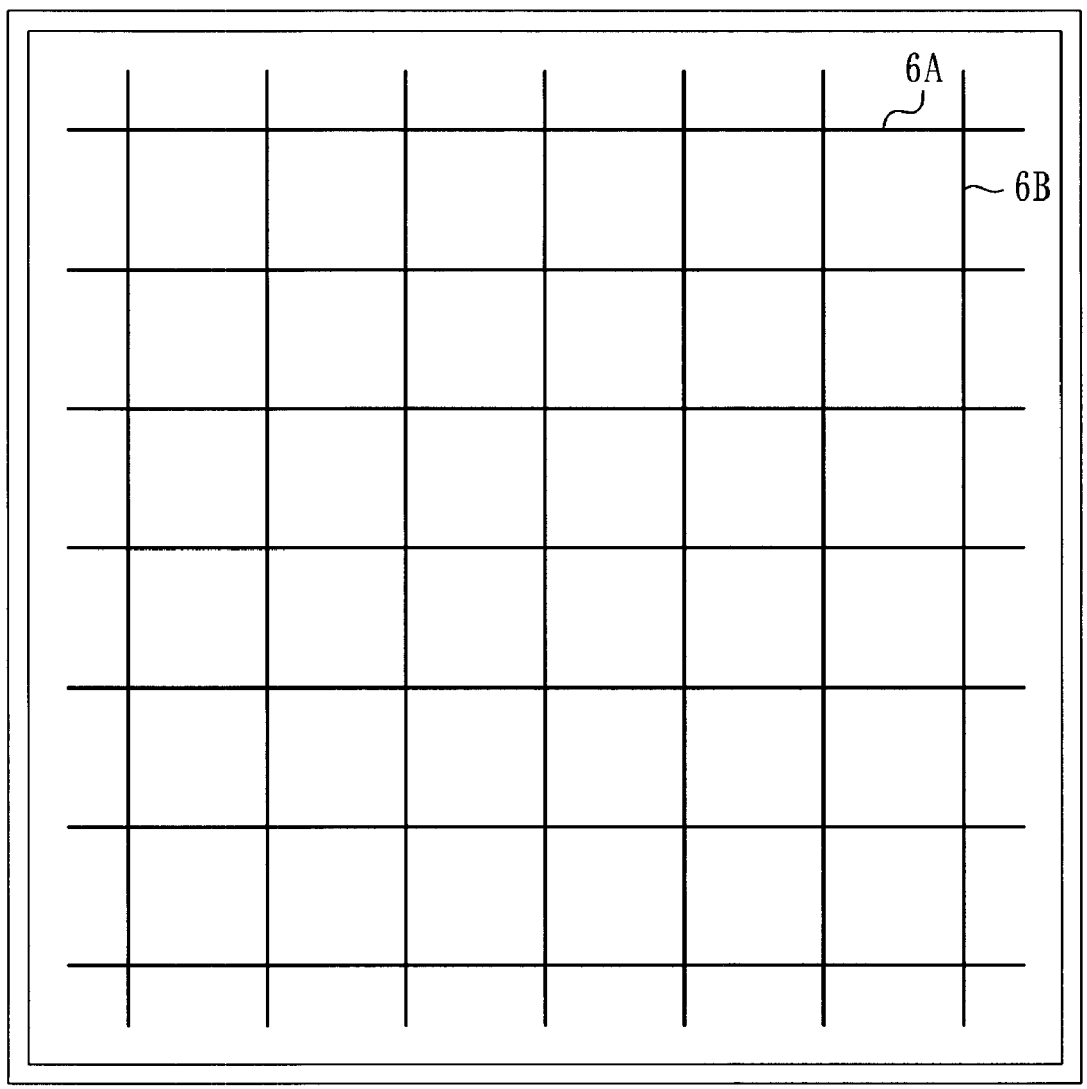
FIG. 7A to FIG. 7D are diagrams showing the design procedures of the clock signal distribution circuit shown in FIG. 1 to FIG. 5.

First, the mesh wiring 6 is placed on a mesh forming area including areas in which circuit elements 8 which are the clock signal supplying targets are arranged (step S101). Specifically, as shown in FIG. 7A, the plurality of horizontal wirings 6A and the plurality of vertical wirings 6B are arranged within the mesh forming area at predetermined intervals.

At this time, the intervals of the plurality of horizontal wirings 6A and the intervals of the plurality of vertical wirings 6B are designed such that a difference in time for a clock signal to reach the plurality of circuit elements 8 can be restricted to a level at which no influence is given on the actual operation.

Figure 7B:
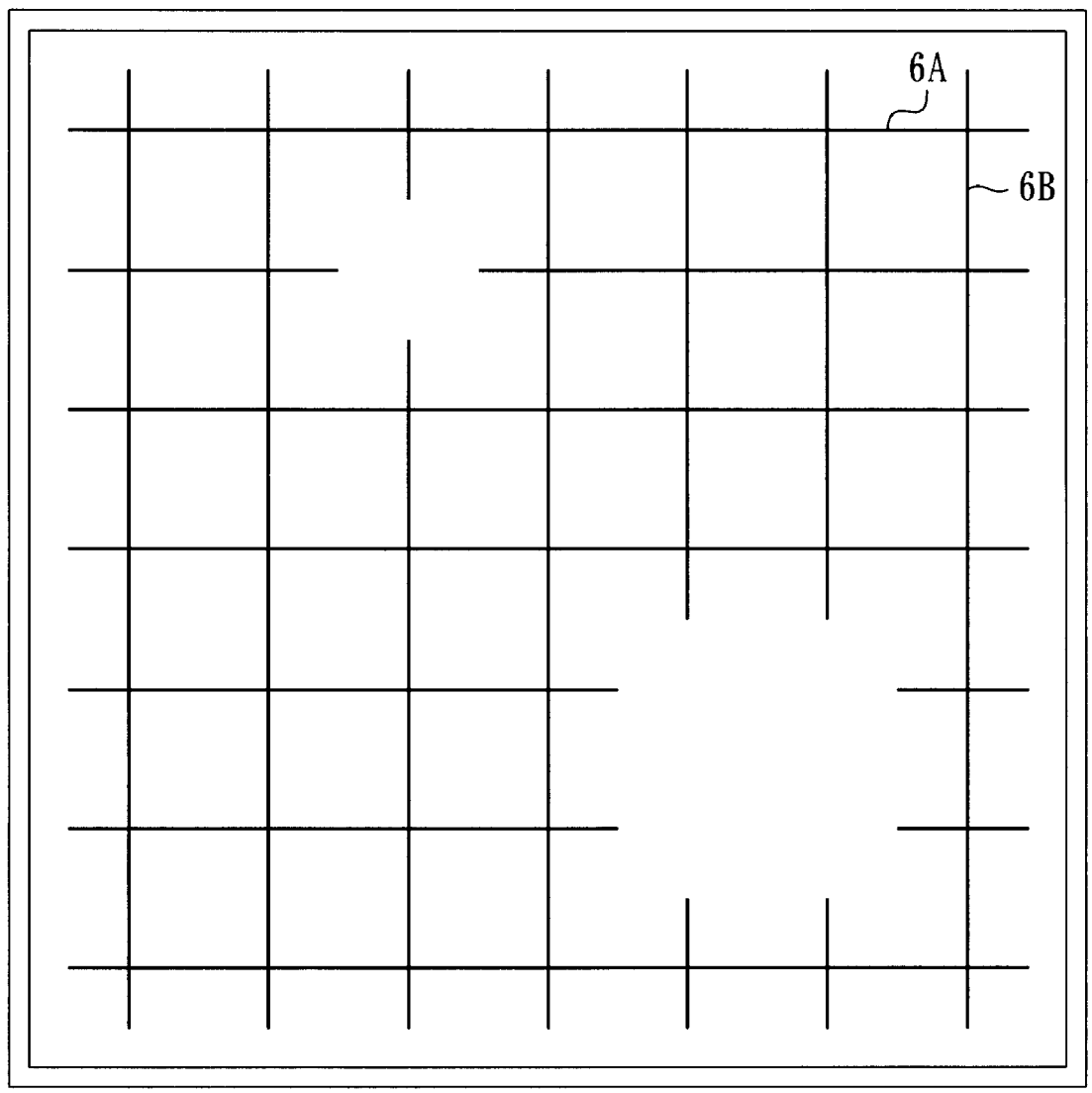

In a case where macros 10 exist within the mesh forming area, portions of the mesh wiring 6 that correspond to the areas for arranging the macros 10 are removed as shown in FIG. 7B (step S102).

A this time, the portions of the mesh wiring 6 that are to be removed is defined such that the end portions of the horizontal wirings 6A and vertical wirings 6B protrude from the closest intersections by a half of the mesh pitch D, as described above.

Figure 7C:
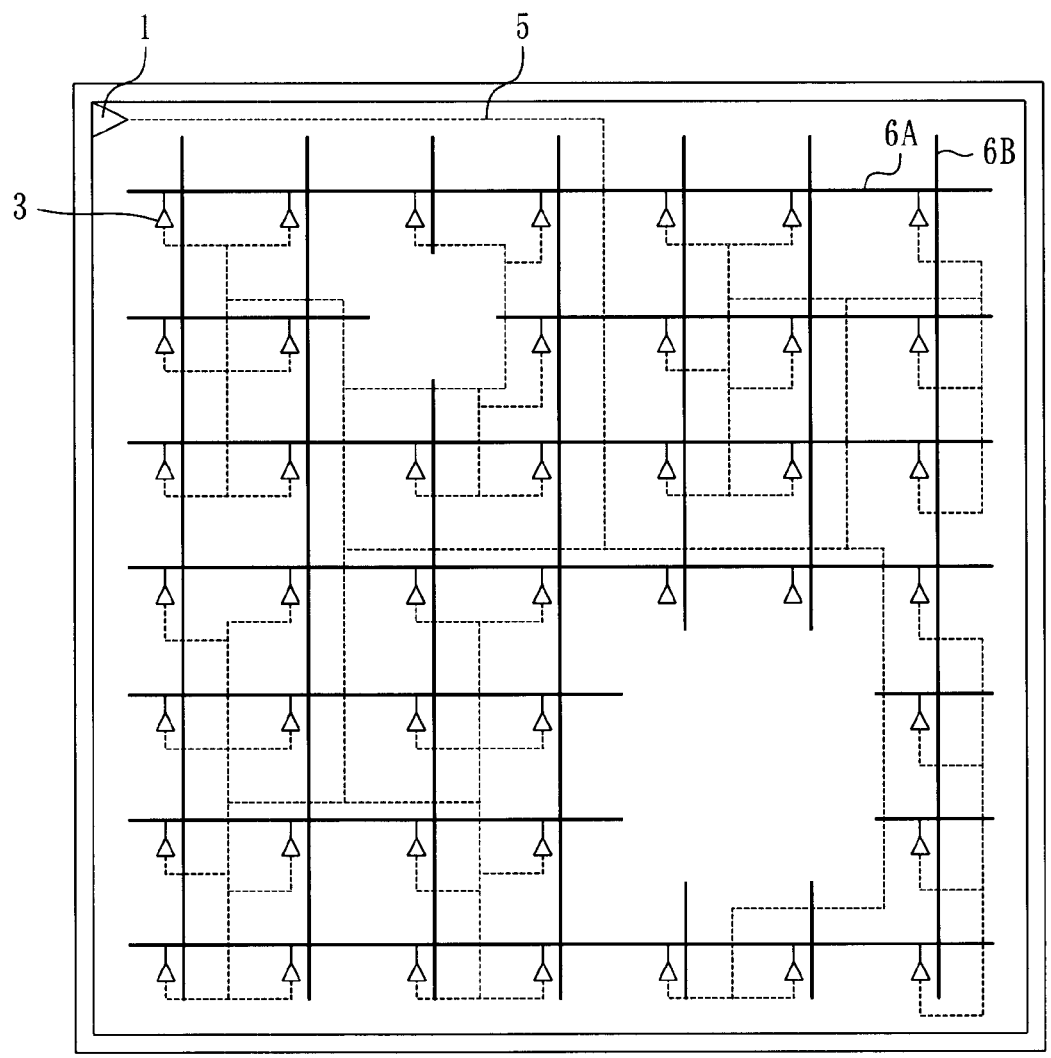

Thereafter, as shown in FIG. 7C, the drive buffers 3 are provided in one to one correspondence to all of the intersections of the mesh wiring 6 (step S103).

Then, the output terminal of each of the drive buffers 3 is connected to an intersection of the mesh wiring 6 (step S104).

Then, as shown in FIG. 7C, the root buffer 1 and all the drive buffer 3 are connected by the tree wiring 5 (step S105). The relay buffers 2 are provided in one to one correspondence to all of the second branching points and branching points thereafter of the tree wiring 5, although not illustrated in FIG. 7D.

The routes of the tree wiring 5 are designed so that an externally supplied clock signal can reach the plurality of drive buffers 3 substantially at the same time.

Figure 7D:
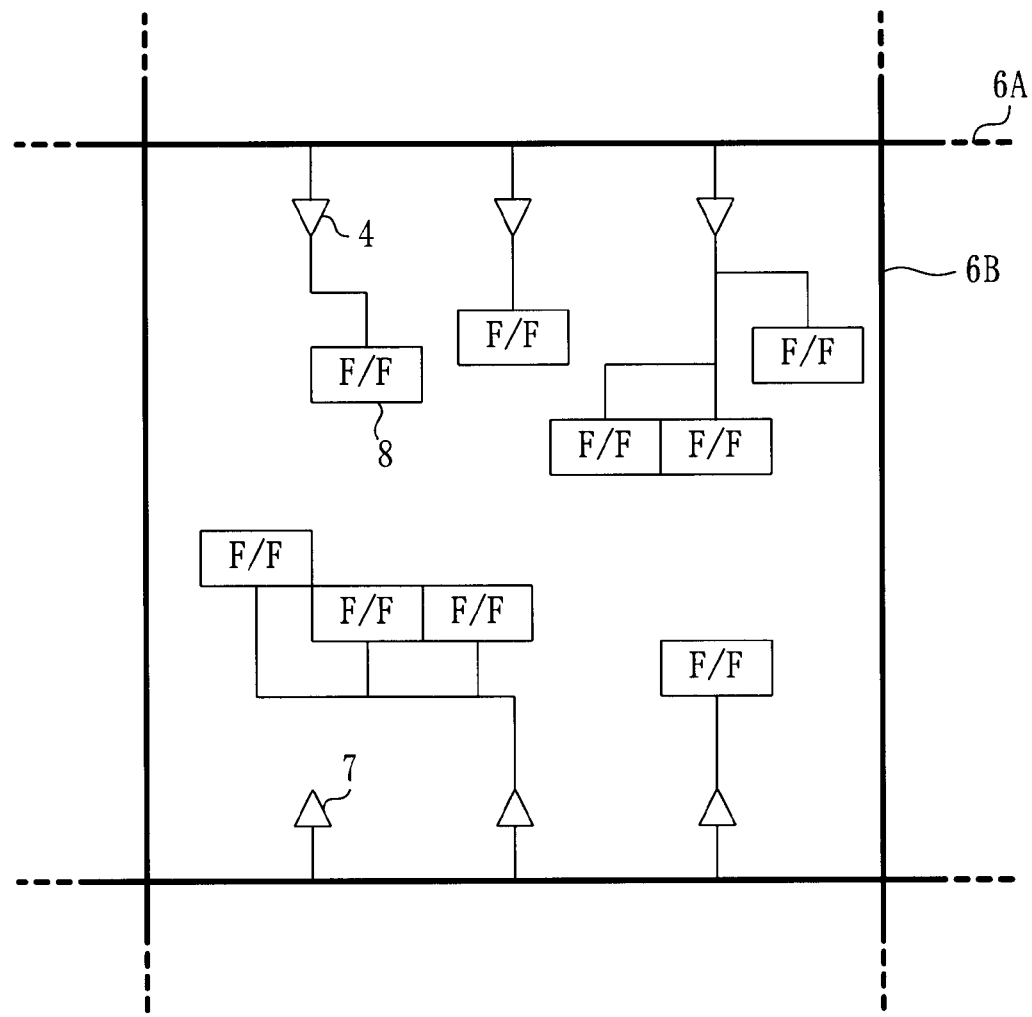

After this, as shown in FIG. 7D, the plurality of end buffers 4 are arranged between the intersections of the mesh wiring 6. Then, the mesh wiring 6 and each circuit element 8 are connected through the end buffer 4 (step S106).

At this time, all of the areas 6C enclosed by the horizontal wirings 6A and the vertical wirings 6B are provided with the same number of end buffers 4, and an end buffer 4 to which no circuit element 8 is connected functions as a dummy buffer 7. As a result, the load to be imposed on the drive buffers 3 is made uniform, and the load to be imposed on the mesh wiring 6 in each area 6C is made uniform.

The clock signal distribution circuit according to the embodiment of the present invention is designed in accordance with the above described procedures.

As described above, with the use of the tree wiring 5, it is possible to provide the drive buffers 3 to all of the intersections of the mesh wiring 6.

Further, it is possible to make the load to be imposed on the drive buffers 3 uniform by designing the ends of the horizontal wirings 6A and vertical wirings 6B to protrude from the intersections by a half of the mesh pitch D, and by providing the same number of end buffers 4 to all the areas 6C enclosed by the horizontal wirings 6A and the vertical wirings 6B.

Furthermore, it is possible to remove the portions to be removed from the mesh wiring 6 while keeping the load to be imposed on the drive buffers 3 uniform, by designing the portions to be removed such that the end portions of the horizontal wirings 6A and vertical wirings 6B protrude by a half of the mesh pitch D.

As a result, it is possible to prevent occurrence of a clock skew without restricting the arrangement of the circuit elements 8 and the macros 10. In other words, it is possible to apply with each the above described clock signal distribution circuit to various devices different in scales and circuit structures.

The routes of the tree wiring 5 may be changed in accordance with the number of drive buffers 3. For example, it is possible to increase or decrease the number of branching points, or to branch a path into four routes at a branching point.

Further, if it is secured that there occurs substantially no clock skew, the drive buffers 3 may be connected not to the intersections of the mesh wiring 6, but near the intersections.

Figure 8A:
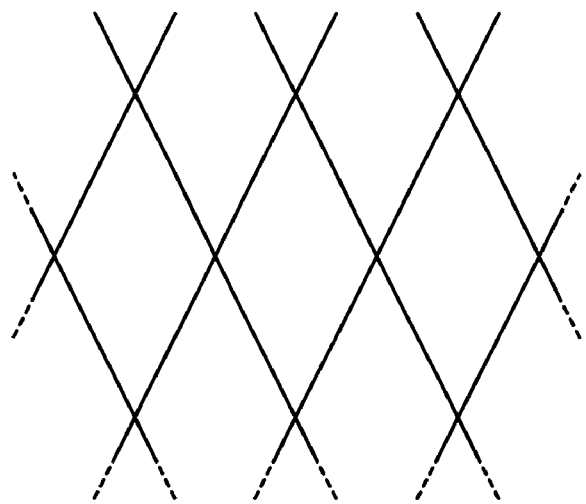
FIG. 8A and FIG. 8B are diagrams showing examples of mesh shape of a mesh wiring included in the clock signal distribution circuit shown in FIG. 1 to FIG. 5.
Figure 8B:
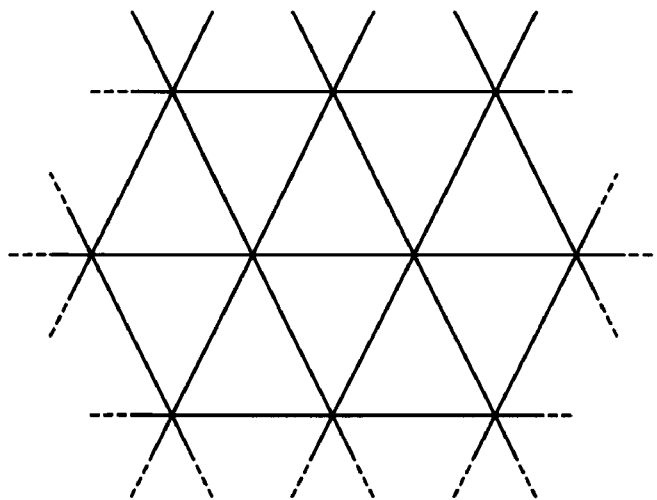
Figure 9A:
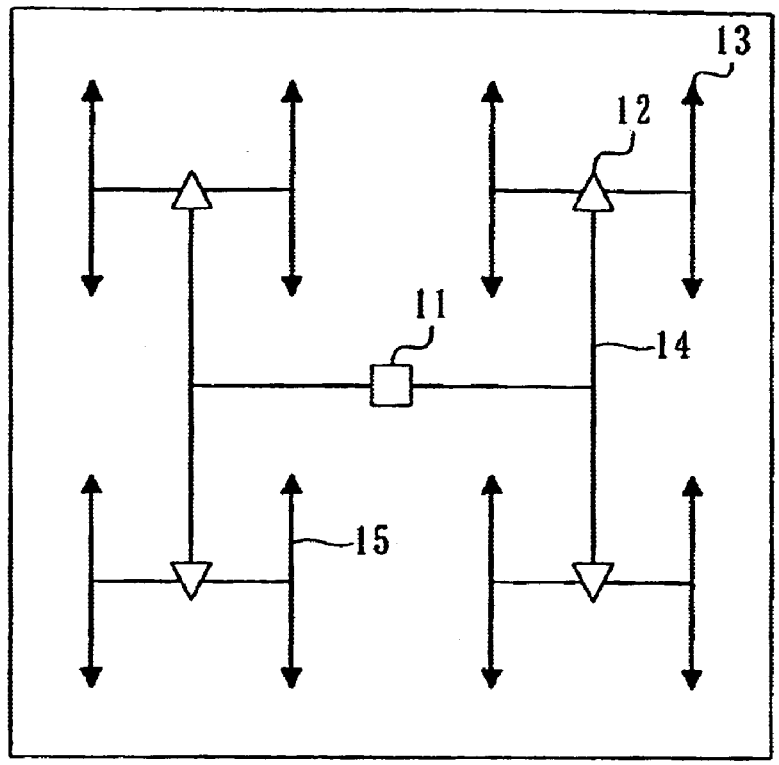
FIG. 9A and FIG. 9B are diagrams showing structures of conventional circuits for distributing a clock signal.
Figure 9B:
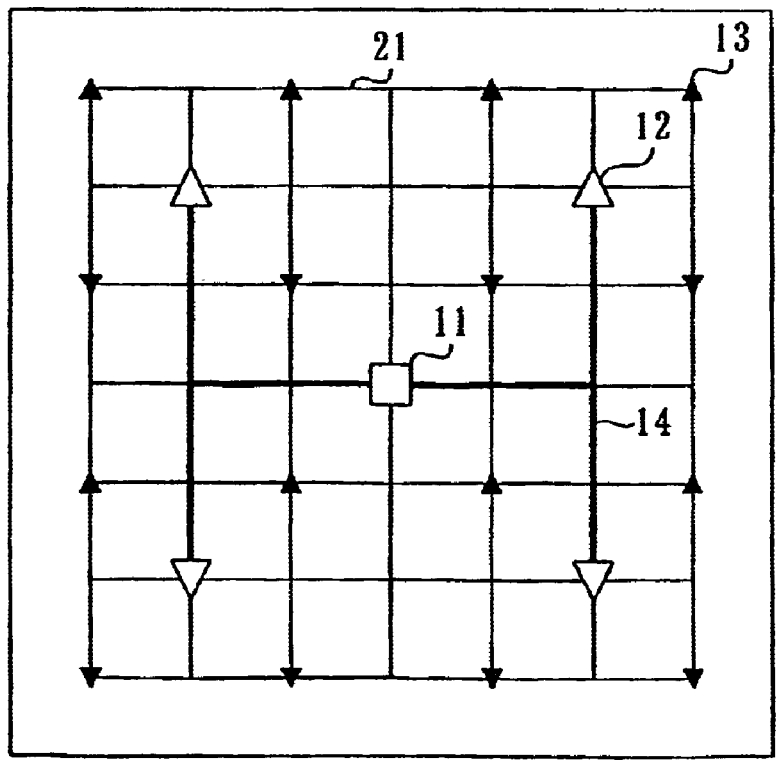

The mesh shape of the mesh wiring 6 may not be limited to the above described square shape. For example, the mesh wiring 6 may have a rhombus shape as shown in FIG. 8A, or may have a triangle shape as shown in FIG. 8B. However, also in those cases, the mesh wiring 6 must protrude from the intersections which face toward outer circumference of the mesh wiring 6 or from the intersections which face toward the portions to be removed by a predetermined length, in order to keep the load imposed on the drive buffers 3 uniform.

Further, the root buffer 1 and the relay buffers 2 described in the above embodiment may be omitted. However, also in this case, the routes of the tree wiring 5 should be set so that an externally supplied clock signal reaches the plurality of drive buffer 3 substantially at the same time.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-283953 filed on Sep. 18, 2001 and including specification, claims, drawings and summary. The disclosure of the above Japanese Patent Application is incorporated herein by reference in its entirety.

What is claimed is:

1. A clock signal distribution circuit which distributes an externally supplied clock signal to a plurality of circuits, said clock signal distribution circuit comprising:
    a tree wiring having wiring routes branched like a tree;
    a mesh wiring having meshed wiring routes;
    a plurality of first clock buffers which are connected to terminals of said tree wiring, and supply a clock signal supplied thereto from outside through said tree wiring, to said mesh wiring; and
    a plurality of second clock buffers which are connected to said mesh wiring, and supply the clock signal supplied thereto from said plurality of first clock buffers through said mesh wiring, to the plurality of circuits,
    wherein said plurality of first clock buffers are connected to intersections which exist on the wiring routes of said mesh wiring in one to one correspondence.

2. The clock signal distribution circuit according to claim 1, wherein said mesh wiring protrudes from intersections thereof which face toward outside by a predetermined length, so that load to be imposed on said plurality of first clock buffers becomes uniform.

3. The clock signal distribution circuit according to claim 2, wherein:
    said mesh wiring is constituted by a plurality of horizontal wirings arranged in parallel with one another at predetermined intervals, and a plurality of vertical wirings arranged in parallel with one another at predetermined intervals and perpendicularly to said horizontal wirings; and
    ends of said plurality of horizontal wirings and ends of said plurality of vertical wirings protrude from closest intersections by a length corresponding to a half of a mesh pitch.

4. The clock signal distribution circuit according to claim 2, wherein a part of said mesh wiring is removed, the part corresponding to a region for arranging a macro to be arranged within an area in which said mesh wiring is formed.

5. The clock signal distribution circuit according to claim 4, wherein said mesh wiring protrudes from intersections thereof which face toward the removed part by a predetermined length, so that load to be imposed on said plurality of first clock buffer becomes uniform.

6. The clock signal distribution circuit according to claim 5, wherein:
    said mesh wiring is constituted by a plurality of horizontal wirings arranged in parallel with one another at predetermined intervals, and a plurality of vertical wirings arranged in parallel with one another at predetermined intervals and perpendicularly to said horizontal wirings; and
    in neighborhood of the removed part of said mesh wiring, ends of said plurality of horizontal wirings and ends of said plurality of vertical wirings protrude from closest intersections by a length corresponding to a half of a mesh pitch.

7. The clock signal distribution circuit according to claim 5, wherein same number of said plurality of second clock buffers are provided to each of a plurality of regions enclosed by the wiring routes of said mesh wiring.

8. The clock signal distribution circuit according to claim 7, wherein among said plurality of second clock buffers, a second clock buffer, to which no target circuit of supplying the clock signal is connected, functions as a dummy buffer in order to keep load to be imposed on said plurality of first clock buffers uniform.

9. The clock signal distribution circuit according to claim 8, wherein said plurality of second clock buffers are connected between intersections of said mesh wiring.

10. The clock signal distribution circuit according to claim 8, wherein said tree wiring comprises at least one branching point at which a wiring route is branched into three routes.

11. The clock signal distribution circuit according to claim 8, wherein the wiring routes of said tree wiring are designed so that an externally supplied clock signal reaches said plurality of first clock buffers substantially at a same time.

12. The clock signal distribution circuit according to claim 8, wherein each of branching points of said tree wiring has a third clock buffer which outputs a clock signal which is synchronous with a clock signal supplied thereto.

13. The clock signal distribution circuit according to claim 12, wherein said third clock buffer which is connected to a first branching point among the branching points of said tree wiring is arranged outside of an area in which said mesh wiring is formed.

* * * * *